United States Patent [19]

Suzuki et al.

[11] Patent Number: 4,458,040

[45] Date of Patent: Jul. 3, 1984

[54] AQUEOUS COATING RESIN COMPOSITION

[75] Inventors: Hiroo Suzuki, Kyoto; Tadashi Kuno; Yasuo Yoshimura, both of Tokorozawa; Kiyoshi Okugami, Hatoyamamura; Hisashi Hotta; Shinya Otsuka, both of Yokohama, all of Japan

[73] Assignees: Toyo Ink Manufacturing Co.; Toyo Seikan Kaisha Limited, both of Tokyo, Japan

[21] Appl. No.: 434,729

[22] Filed: Oct. 18, 1982

Related U.S. Application Data

[63] Continuation of Ser. No. 250,604, Apr. 3, 1981, abandoned, which is a continuation-in-part of Ser. No. 099,324, Dec. 3, 1979, abandoned.

[30] Foreign Application Priority Data

Dec. 5, 1978 [JP] Japan ................................ 53-149635

[51] Int. Cl.$^3$ ................................................ C08L 63/10
[52] U.S. Cl. ................................. 523/412; 523/409
[58] Field of Search ................................ 523/409, 412

[56] References Cited

U.S. PATENT DOCUMENTS

| | | | |
|---|---|---|---|
| 3,945,963 | 3/1976 | Levine | 260/29.6 |
| 4,028,294 | 6/1977 | Brown | 260/29.6 |
| 4,151,131 | 4/1979 | Sekmakas | 260/19 EP |
| 4,222,912 | 9/1980 | Sekmakas | 260/23 EP |
| 4,247,439 | 1/1981 | Matthews | 260/29.6 |

*Primary Examiner*—Paul R. Michl
*Attorney, Agent, or Firm*—Sherman & Shalloway

[57] ABSTRACT

Disclosed is an aqueous coating resin composition to be applied to a metal substrate, particularly an inner surface of a metal can or can closure on which an undercoating layer is formed. This coating composition comprises an aqueous dispersion of a self-emulsifiable resin composition being obtained by neutralizing a partial reaction product of (A) an acrylic resin with (B) an epoxy resin, with ammonia or an amine selected from the group consisting of alkylamine, alcohol amines and morpholine in an amount sufficient to maintain the pH value of the composition between 5 and 11, said acrylic resin (A) being an alkali neutralizable acrylic resin having a number average molecular weight of from 10,000 to 100,000, which consists of 12 to 30% by weight of acrylic acid or methacrylic acid and 70 to 88% by weight of at least one member selected from the group consisting of styrene, methylstyrene, vinyltoluene and alkyl esters of acrylic acid and methacrylic acid having 1 to 8 carbon atoms in the alkyl group, said epoxy resin (B) being an aromatic epoxy resin having 1.1 to 2.0 epoxy groups on the average in one molecule and a number average molecular weight of at least 1,400, said partial reaction product having excess carboxyl groups in an amount sufficient to maintain the acid value of the self-emulsifiable resin composition between 30 and 200, and excess oxirane group in an amount such that the residual ratio of the oxirane content (R) is within 5 to 95%. This coating composition is excellent in the storage stability owing to the presence of excess carboxyl groups and provides a self-crosslinked coating excellent in the adhesion, processability, flavor retaining property and resistance to boiling water owing to the presence of excess oxirane groups.

4 Claims, 2 Drawing Figures

Number of counts ⟶

Number of counts ⟶

AQUEOUS COATING RESIN COMPOSITION

This is a continuation of application Ser. No. 250,604, filed Apr. 3, 1981 which in turn is a continuation-in-part of application Ser. No. 099,324 filed Dec. 3, 1979, which are both now abandoned.

BACKGROUND OF THE INVENTION

(1) Field of the Invention

The present invention relates to an aqueous coating resin composition. More particularly, the invention relates to an aqueous coating resin composition useful for forming a coating directly on a tinplate, an aluminum plate, a treated steel plate or the like, or on an undercoating layer of a phenol-epoxy or epoxy-amino paint, which is formed on such metal substrate, particularly the inner surface of a metal can or can closure.

(2) Description of the Prior Art

For metal cans, there have heretofore been used a phenol-epoxy or epoxy-amino paint as a base coat paint to be applied on the inner surface and a thermoplastic copolymer composed mainly of vinyl chloride and vinyl acetate as a topcoat-forming material. When the base coat alone is applied, the flavor of the content is degraded, and when only the topcoat of a copolymer composed mainly of vinyl chloride and vinyl acetate is formed, the adhesion to the metal substrate and the resistance are insufficient. Since this copolymer is readily decomposed under heat, the temperature range for the baking treatment is very narrow. Furthermore, since conventional topcoat-forming paints are of the non-aqueous type and contain considerable quantities of organic solvents, pollution of the working atmosphere and other problems are caused and the use of these paints involves a risk of occurrence of a fire.

As means for solving these problems, there have been proposed various aqueous coating compositions to be used instead of the conventional vinyl chloride-vinyl acetate paints. For example, the specification of U.S. Pat. No. 4,021,396 discloses an aqueous coating composition obtained by neutralizing an epoxy resin and an acrylic copolymer formed by copolymerizing 0.5 to 10% of an unsaturated carboxylic acid with other specific monomers, with ammonium or an amine. From experiments made by us, it was found that this aqueous coating composition is poor in the storage stability, particularly at a high temperature (about 50° C.) and gelation is readily caused at such high temperature, and that at the baking step, there is caused a problem that the physical properties of the resulting coatings vary widely depending on the difference of the baking temperature.

Japanese Patent Application Laid-Open Specification No. 1228/78 proposes a paint formed by grafting an unsaturated carboxylic acid-containing monomer to the aliphatic skeleton of an epoxy resin, neutralizing a mixture of this graft polymer and a carboxylic acid-modified functional addition polymer with ammonium or an amine and dispersing the neutralization product in an aqueous medium. Furthermore, Japanese Patent Application Laid-Open Specification No. 1285/78 discloses an improvement of the above-mentioned technique, in which the epoxy group of an epoxy resin is reacted with a stopping agent to improve the resistance to hydrolysis.

The proposals made in these Japanese Patent Application Laid-Open Specifications still involve problems to be solved. For example, since it is necessary to effect graft polymerization, expensive and dangerous benzoyl peroxide or a corresponding free radical initiator should be used in large quantities. Moreover, the molecular weight of the addition polymer is reduced, resulting in degradation of the physical properties of the resulting coatings. Therefore, there are caused various disadvantages with respect to physical properties, adaptability to operations and manufacturing and running costs. Still further, scattering of properties in products is readily caused according to reaction conditions adopted for the graft polymerization.

The most important role of a composition for coating the inner surface of a metal can is to sanitarily protect the content. If dissolution of components of the coating into the content is advanced at the sterilizing step or during long-time storage, the flavor of the content is degraded and a sanitarily undesirable phenomenon is caused by the extracted components. Accordingly, the coating formed on the inner face of the metal can should have such a characteristic that dissolution of components of the content into the content should be reduced to a level as low as possible under treatment conditions which the metal can actually undergoes. (Ordinarily, dissolution of components of the coating into the content is evaluated depending on the ratio of extraction of the components in water from the coating.) All of the aqueous coating compositions according to the above-mentioned proposals are still insufficient in this point. It is therefore a primary object of the present invention to provide an aqueous coating composition which is excellent in the stability and can give coatings having excellent physical properties and in which dissolution of components of the coating into the content can be controlled to a very low level.

From experiments made by us, it was found that in an aqueous coating composition comprising an acrylic resin and an epoxy resin, if the molecular weight of the epoxy resin used is low, the ratio of extraction of the components in water from the resulting coating tends to increase. In this case, the epoxy group of the low-molecular-weight epoxy resin chemically reacts in the aqueous medium during storage, resulting in increase of the viscosity or occurrence of gelation. The coating formed by using such composition having an increased viscosity or such gelled composition is inferior in various physical properties. On the other hand, when a high-molecular-weight epoxy resin having a number average molecular weight exceeding 1,400 is employed, the water extraction ratio is considerably reduced, but the level of the water extraction ratio is not so low as the level attainable by the conventional vinyl chloride copolymer paint. Although chemical reaction of the epoxy group of the high-molecular-weight epoxy group during storage is reduced, the compatibility of the epoxy resin with the acrylic resin is poor and the epoxy resin tends to separate from the acrylic resin during storage. Furthermore, in the resulting coating, whitening is readily caused owing to this poor compatibility, and a coating having satisfactory physical properties cannot be obtained.

SUMMARY OF THE INVENTION

We made researches with a view to solving the foregoing problems and as a result, we succeeded in developing a novel aqueous coating resin composition in which the ratio of extraction of the components in water from the coating, that is, consumption of potassium permanganate, is remarkably reduced, an excellent flavor-retaining property can be attained, the storage stability in the form of a paint is very good and the resulting coating is excellent in various physical properties such as the resistance to boiling water and the processability. Thus, we have now completed the present invention.

More specifically, in accordance with the present invention, there is provided an aqueous coating resin composition which comprises an aqueous dispersion of a self-emulsifiable resin composition being obtained by neutralizing a partial reaction product of (A) an acrylic resin with (B) an epoxy resin with ammonia or an amine selected from the group consisting of alkylamine, alcohol amines and morpholine in an amount sufficient to maintain the pH value of the composition between 5 and 11, said acrylic resin (A) being an alkali neutralizable acrylic resin having a number average molecular weight of from 10,000 to 100,000, which consists essentially of 12 to 30% be weight of acrylic acid or methacrylic acid and 70 to 88% by weight of at least one member selected from the group consisting of styrene, methylstyrene, vinyltoluene and alkyl esters of acrylic acid and methacrylic acid having 1 to 8 carbon atoms in the alkyl group, said epoxy resin (B) being an aromatic epoxy resin having 1.1 to 2.0 epoxy groups on the average in one molecule and a number average molecular weight of at least 1,400, said partial reaction product having excess carboxyl groups in an amount sufficient to maintain the acid value of the self-emulsifiable resin composition between 30 and 200, and excess oxirane groups in an amount such that the residual ratio of the oxirane content (R) defined by the following formula:

$$R = \frac{100\ Y(M_A + M_B)}{M_B X} \quad (1)$$

wherein $M_A$ represents % by weight of the acrylic resin (A) contained in the partial reaction product, $M_B$ represents % by weight of the epoxy resin (B) contained in the partial reaction product, X represents a concentration (m-mol/100 g of solid) of oxirane group contained in the epoxy resin (B) and Y represents concentration (m-mol/100 g solid) of oxirane group contained in the partial reaction product, is within from 5 to 95%.

The characteristic features of the aqueous coating resin composition of the present invention are as follows.

(1) Since a high-molecular-weight epoxy resin is used and this high-molecular-weight epoxy resin is chemically bonded to an acrylic resin, the ratio of extraction of the components in water from the resulting coating is very low. Accordingly, the flavor-retaining property under treatment conditions which the metal can practically undergoes is very good and consumption of potassium permanganate is remarkably reduced.

(2) Since a high-molecular-weight epoxy resin is used, increase of the viscosity of the paint or gelation owing to chemical reaction of the epoxy group is not caused during storage.

(3) Since a high-molecular-weight epoxy resin and an acrylic resin, between which the compatibility is very low, are chemically bonded to form a carboxyl group-excessive, self-emulsifiable epoxy resin-acrylic resin partial reaction product, the phase separation is not caused in the paint during storage.

(4) Since there are present epoxy groups left at the terminals, the above-mentioned partial reaction product has a self-crosslinking property, and by virtue of not only this self-crosslinking property and a good film-forming property inherent of the acrylic resin, a coating having excellent physical properties can be obtained.

(5) An aqueous coating resin composition including an aromatic epoxy resin having 1.1 to 2.0 epoxy groups in one molecule and a number average molecular weight of 2,000 to 10,000, which is obtained by heating an aromatic epoxy resin having 2 epoxy groups in one molecule and a number average molecular weight of 1,400 to 5,000 in the presence or absence of an epoxy group-modifying agent has a very industrially advantageous property that variation of properties in the resulting coating, which is due to the variation of the baking temperature at the coating-forming step, is drastically reduced. This aqueous coating resin composition is excellent over aqueous coating resin compositions including an aromatic epoxy resin which has not been subjected to the heat treatment, with respect to other properties of the coating.

DETAILED DESCRIPTION OF THE PREFERRED EMBODIMENTS

Figure 1:
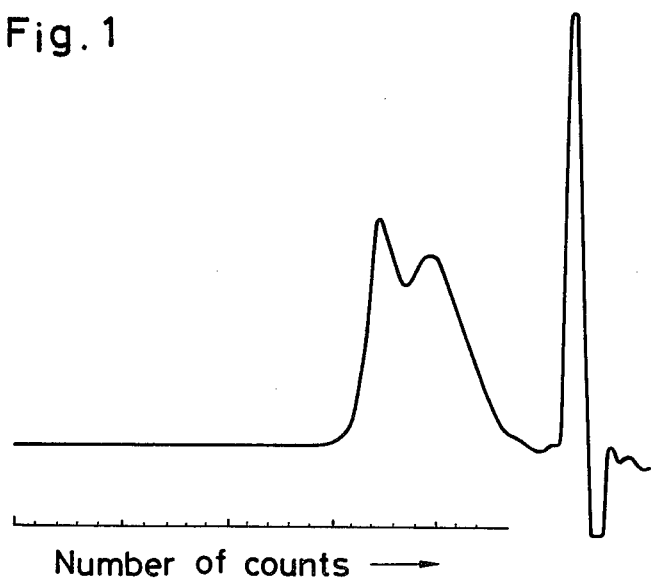
FIG. 1 is a chart showing the molecular weight distribution determined according to GPC just after mixing (A) a carboxyl group-containing acrylic resin with (B) an epoxy resin solution at room temperature in Example 1.

The alkali-neutralizable acrylic resin (A) that is used in the present invention may be obtained by copolymerizing 12 to 30% by weight of acrylic acid or methacrylic acid with 70 to 88% by weight of at least one member selected from the group consisting of styrene, methylstyrene, vinyltoluene and alkyl esters of acrylic acid and methacrylic acid having 1 to 8 carbon atoms in the alkyl group in a hydrophilic organic solvent having a boiling point of 70° to 230° C., such as ethyleneglycol monoethyl ether or ethyleneglycol monobutyl ether in the presence of a radical polymerization initiator such as azobisisobutyronitrile or a peroxide at a temperature of 80° to 150° C. If the amount of acrylic acid or methacrylic acid used for this copolymerization is smaller than 12% by weight, the dispersion stability of the resulting aqueous coating resin composition is poor. If the amount of acrylic acid or methacrylic acid is larger than 30% by weight, the water resistance of the resulting coating is degraded.

As the alkyl ester of acrylic acid or methacrylic acid, there can be mentioned, for example, methyl acrylate or methacrylate, ethyl acrylate or methacrylate, isopropyl acrylate or methacrylate, n-butyl acrylate or methacrylate, isobutyl acrylate or methacrylate, n-amyl acrylate or methacrylate, isoamyl acrylate or methacrylate, n-hexyl acrylate or methacrylate, 2-ethylhexyl acrylate or methacrylate and n-octyl acrylate or methacrylate.

From the viewpoint of the sanitary effect of the inner coating of a metal can on the content food, it is preferred that the monomer combination for formation of the above-mentioned copolymer be selected from (1) methyl methacrylate/2-ethylhexyl acrylate/acrylic acid, (2) styrene/methyl methacrylate/ethyl acrylate/- methacrylic acid and (3) styrene/ethyl acrylate/methacrylic acid.

The alkali-neutralizable acrylic resin (A) has a number average molecular weight of 10,000 to 100,000, preferably 20,000 to 40,000. Furthermore, it is preferred that the acid value of the alkali-neutralizable acrylic resin (A) be in the range of from 80 to 240 as calculated as the solid.

Epichlorohydrin/bisphenol type epoxy resins are used in the present invention as the aromatic epoxy resin (B) having 1.1 to 2.0 epoxy groups on the average in one molecule and a number average molecular weight of at least 1,400. For example, there can be mentioned "Epikote 1004", "Epikote 1007" and "Epikote 1009" manufactured and sold by Shell Chemical Co. and "Epiclon 4050" and "Epiclon 7050" manufactured by Dainippon Ink Chemicals Co. These commercially available products have two epoxy groups in one molecule and a number average molecular weight of 1,400 to 5,000. In the present invention, a high-molecular-weight aromatic epoxy resin obtained by heating and modifying an unmodified aromatic epoxy resin such as mentioned above in the presence or absence of an epoxy group-modifying agent. The resulting modified aromatic epoxy resin has an elevated molecular weight and the aqueous coating resin composition obtained by using such modified aromatic epoxy resin provides a coating having a much reduced water extraction ratio. When the modified epoxy resin obtained by conducting the heat treatment in the presence of an epoxy group-modifying agent is used, the water extraction ratio is further reduced, as compared with the case where the modified epoxy resin obtained by conducting the heat treatment in the absence of an epoxy group-modifying agent is used. Moreover, by the use of such modified aromatic epoxy resin, there can be attained an effect that variation of the water extraction ratio or physical properties of the coating owing to the variation of the baking temperature at the coating-forming step can be remarkably reduced.

As the epoxy group-modifying agent, there can be used, for example, bisphenols such as bisphenol A and bisphenol B, and vegetable oil fatty acids such as dehydrated castor oil, soybean oil fatty acid, cotton seed oil fatty acid, safflower oil fatty acid, tall oil fatty acid, linseed oil fatty acid, castor oil fatty acid, coconut oil fatty acid and palm oil fatty acid, and mixtures thereof. If necessary, aromatic carboxylic acids such as benzoic acid and p-tert-butyl benzoate may be used in combination with the above modifiers. Theoretically, the amount of the epoxy group-modifying agent may be up to 45 equivalent % based on the epoxy group of the unmodified aromatic epoxy resin. However, since heating is ordinarily necessary for this modification reaction and self-condensation is caused in the aromatic epoxy resin under heating, a modified aromatic epoxy resin having 1.1 to 2.0 epoxy groups in one molecule and a number average molecular weight of 2,000 to 10,000 is practically obtained by using the epoxy group-modifying agent in an amount of 0.5 to 10 equivalent %.

Conditions to be adopted for the heating reaction between the unmodified aromatic epoxy resin and the epoxy group-modifying agent will now be described.

When a bisphenol is used as the modifying agent, predetermined amounts of the epoxy resin and bisphenol are charged in a stirrer-equipped reaction vessel, the inside atmosphere of which has been replaced by nitrogen, and the mixture is cooked in the absence of a solvent or in a hydrophilic organic solvent such as ethyleneglycol monobutyl ether at 150° to 170° C. for about 5 hours. When a fatty acid is used as the modifying agent, predetermined amounts of the epoxy resin and fatty acid and, if necessary, a small amount of sodium carbonate as the alkali catalyst, are changed in the same stirrer-equipped, nitrogen-substituted reaction vessel as described above, and the mixture is cooked in the absence of a solvent or in a hydrophilic organic solvent such as ethyleneglycol monobutyl ether at 140° to 170° C. for about 5 hours. The heat treatment not using an epoxy group-modifying agent is carried out under similar conditions. More specifically, heating is conducted in the absence of a solvent or in a hydrophilic organic solvent such as ethyleneglycol monobutyl ether at 140° to 170° C. for several hours, if desired, in the presence of a catalyst such as sodium carbonate.

The modification reaction of unmodified aromatic epoxy resins can be controlled by measuring the content of oxirane according to the hydrobromic acid/acetic acid method described by, for example, "Determination of Epoxide Groups" written by B. Dobinson, W. Hofmann and B. P. Stark.

In the present invention, it is very important that a partial reaction product of the alkali-neutralizable acrylic resin (A) with the epoxy resin has excess carboxyl groups in an amount sufficient to maintain the acid value of the self emulsifiable resin composition between 30 and 200 (as calculated as the solid), and excess oxirane groups in an amount such that the residual ratio of the oxirane content (R) defined by the aforementioned formula (I) is within 5 to 95%. If the acid value of the partial reaction product is smaller than 30, the dispersion stability of the resulting aqueous coating resin composition is poor without aid of an emulsifying agent (surfactant). If the acid value of the partial reaction product is larger than 200, the water resistance of the resulting coating is degraded. The coating composition prepared by conducting the reaction of the acrylic resin (A) with the epoxy resin (B) until the oxirane group is substantially consumed provides a coating such that the dissolution of components of the coating into the content is in high level. In the coating composition of the present invention, since the oxirane group is left, the composition has a self-crosslinking property and provides a coating having excellent physical and chemical properties by virtue of this characteristic as well as a good film forming property of the acrylic resin. If, the residual ratio of the oxirane content is beyond the scope of the present invention, the obtained coating is inferior to the coating formed from the coating composition of the present invention in the properties, especially the permanganate consumption and water extraction ratio.

In the present invention, the acrylic resin (A) and the epoxy resin (B) is reacted under the condition that the acid value and the residual ratio of the oxirane content are within the scope of the present invention.

In general, the two components (A) and (B) are stirred in a hydrophilic organic solvent such as ethyleneglycol monobutyl ether in the presence or absence of ammonia or an amine as decribed hereinafter at 60° to 170° C. for 10 minutes to 2 hours, if necessary, under pressure. The reaction can be controlled by measuring the content of oxirane and the acid value, examining increase of the viscosity or checking the molecular weight distribution according to gel permeation chromatography (GPC) as described in detail in Example 1 given hereinafter. When the reaction is conducted at high temperature, the reaction should be stopped in short time.

In the present invention, the weight ratio (A)/(B) of the alkali-neutralizable acrylic resin (A) to the aromatic epoxy resin (B) is preferably adjusted in the range of from 4/1 to ½. When the amount of the component (A) exceeds beyond this range, a tendency of degradation of physical properties of the resulting coating is observed. On the other hand, when the amount of the component (B) is too large, the ratio of extraction of the components in water from the coating is increased and the stability of the aqueous coating resin composition tends to decrease.

The aqueous coating resin composition of the present invention can be prepared by dispersing the above-mentioned epoxy resin-acrylic resin partial reaction product in an aqueous medium containing ammonia or an amine in such an amount that the pH value of the final coating composition is in the range of from 5 to 11, without using any of dispersing agent or surfactant. As the amine, there can be used, for example, alkylamines such as trimethylamine, triethylamine and butylamine, alcohol amines such as 2-dimethylaminoethanol, diethanolamine, triethanolamine, aminomethylpropanol and dimethylaminomethylpropanol, and morpholine. Furthermore, polyvalent amines such as ethylene-diamine and diethylene-triamine can be used.

By the term "aqueous medium" used herein are meant water and a mixture of water and a hydrophilic organic solvent in which the content of water is at least 10% by weight. As the hydrophilic solvent, there can be mentioned, for example, alkylalcohols such as methanol, ethanol, n-propanol, isopropanol, n-butanol, sec-butanol, tert-butanol and isobutanol, ether alcohols such as methyl cellosolve, ethyl cellosolve, propyl cellosolve, butyl cellosolve, methyl carbitol and ethyl carbitol, ether esters such as methyl cellosolve acetate and ethyl cellosolve acetate, and dioxane, dimethylformamide, diacetone alcohol and tetrahydrofurfuryl alcohol.

The aqueous coating resin composition of the present invention may be applied to a metal plate such as a tinplate, an aluminum plate or a treated steel plate directly or after application of an undercoat or forming processing according to known coating means such as brush coating, spray coating, dip coating, roll coating or electric deposition coating. The thickness of the coating is not particularly critical, so far as the entire surface of the metal plate is uniformly coated, but ordinarily, the thickness of the coating is adjusted in the range of from 1 to 20 microns.

When the aqueous coating resin composition is applied to a metal plate such as a tinplate, an aluminum plate or a treated steel plate directly or after formation of undercoating of an epoxy-amino resin or the like, a very good adhesion to the metal substrate can be attained, and especially when the aqueous coating resin composition of the present invention is applied to the inner surface of a metal can, the water extraction ratio can be drastically reduced and a coating excellent in the flavor-retaining property, adhesion, resistance to boiling water and processability can be obtained. Moreover, the aqueous coating resin composition of the present invention may be used for the manufacture of aqueous varnishes for dispersing pigments therein, metal paints and printing inks, and if the kind of the acrylic resin is appropriately chosen, the composition of the present invention may be used as an adhesive, a fiber-processing agent or the like.

The present invention will now be described in detail with reference to the following Examples that by no means limit the scope of the invention. In these Examples, all of "%" and "parts" are by weight.

EXAMPLE 1

(A) Preparation of Carboxyl Group-Containing Acrylic Resin Solution:

| Styrene | 300.0 parts |
| Ethyl acrylate | 210.0 parts |
| Methacrylic acid | 90.0 parts |
| Ethyleneglycol monobutyl ether | 388.0 parts |
| Benzoyl peroxide | 12.0 parts |

¼ of a mixture having the above composition was charged in a 4-neck flask, the inside atmosphere of which had been replaced by nitrogen, and the temperature was elevated to 80° to 90° C. by heating. While the temperature was being maintained at this level, remaining ¾ of the mixture was gradually added dropwise over a period of 2 hours. After completion of the dropwise addition, the reaction mixture was stirred at the above temperature for 2 hours and was then cooled to obtain a carboxyl group-containing acrylic resin solution having an acid value of 93 as calculated as the solid (all the acid values mentioned hereinafter are those as calculated as the solid), a solid content of 59.7% and a viscosity of 4100 cps as measured at 25° C. (all the viscosity values mentioned hereinafter are those as measured at 25° C.).

(B) Preparation of Epoxy Resin Solution:

| Epikote 1007 | 500 parts |
| Ethyleneglycol monobutyl ether | 333.3 parts |

All of a mixture having the above composition was charged in a 4-neck flask, the inside atmosphere of which had been replaced by nitrogen, and the inside temperature was elevated to 100° C. by gradual heating and the mixture was stirred for 1 hour to completely dissolve the epoxy resin. Then, the solution was cooled to 80° C. to form an epoxy resin solution having a solid content of 60%.

(C) Preparation of Aqueous Coating Resin Composition:

| (1) Carboxyl group-containing acrylic resin solution (A) | 100 parts |
| Epoxy resin solution (B) | 50 parts |
| (2) 2-Dimethylaminoethanol | 9.3 parts |
| (3) Deionized water | 290.7 parts |

All of the mixture (1) was charged in a 4-neck flask, and the component (2) was added thereto under stirring to neutralize the contained carboxyl groups substantially equimolarly. Then, the inside temperature was elevated to 80° C. and stirring was conducted at this temperature for 30 minutes. Then, the mixture was cooled to room temperature. The ratio of decrease of the oxirane content was 63.5% (R=37.5%), the acid value was 56, and the viscosity was 1.5 times the viscosity before this cooking treatment.

Figure 2:
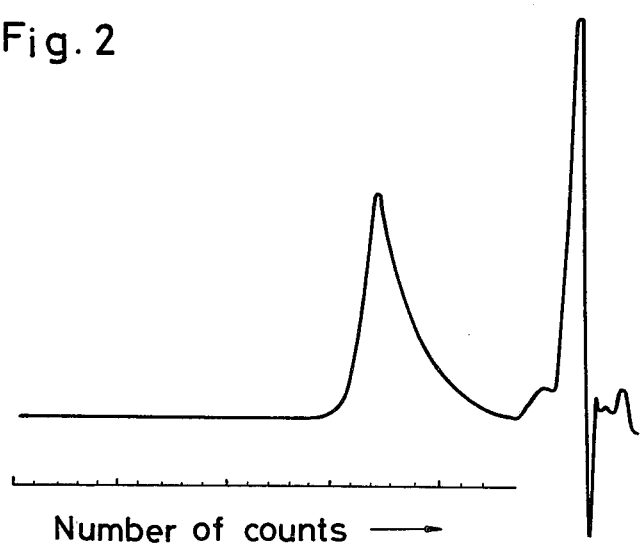
FIG. 2 is a chart showing the molecular weight distribution determined according to GPC when the above-mentioned mixture has been cooked at 80° C. for 1 hour.

The molecular distribution before cooking, determined according to GPC, is shown in the chart of FIG. 1. As is seen from FIG. 1, there are present two peaks of the high-molecular-weight acrylic resin and the low-molecular-weight epoxy resin. In the molecular weight distribution after cooking, shown in the chart of FIG. 2, the peak of the low-molecular-weight epoxy resin is not observed. Accordingly, it was confirmed that the epoxy resin was rendered pendant from the acrylic resin.

After the above-mentioned cooking treatment, the component (3) was gradually added under agitation to obtain a slightly milky white dispersion having a solid content of 19.8% and a viscosity of 360 cps. When the resulting dispersion was stored at 50° C. for 1 month, no change was observed.

EXAMPLE 2

(B) Preparation of Fatty Acid-Modified Epoxy Resin Solution:

| (1) Epikote 1007 | 500.0 parts |
|---|---|
| Coconut oil fatty acid | 2.6 parts |
| Sodium carbonate | 0.2 part |
| Ethyleneglycol monobutyl ether | 125.4 parts |
| (2) Ethyleneglycol monobutyl ether | 209.4 parts |
| (3) Deionized water | 290.7 parts |

All of the mixture (1) was charged in a 4-neck flask and the component (2) was added thereto under agitation to neutralize 90 mole % of the contained carboxyl groups. Then, the inside temperature was elevated to 100° C. and cooking was carried out at this temperature for 30 minutes. The ratio of decrease of the oxirane content was found to be 83.5% (R=16.5%) and the acid value was 56.

The component (3) was gradually added to the reaction mixture under agitation to obtain a milky white dispersion having a solid content of 20.1% and a viscosity of 500 cps. When this dispersion was stored at 50° C. for 1 month, no change was observed.

EXAMPLES 3 TO 6 AND COMPARATIVE EXAMPLES 1 TO 7

(A) Preparation of Carboxyl Group-Containing Acrylic Resin Solution:

A carboxyl group-containing acrylic resin solution was prepared according to a recipe shown in Table 1 in the same manner as described in Example 1.

TABLE 1

| Components | Example No. | | | | Comparative Example No. | | | | | | |
|---|---|---|---|---|---|---|---|---|---|---|---|
| (parts) | 3 | 4 | 5 | 6 | 1 | 2 | 3 | 4 | 5 | 6 | 7 |
| St | 40 | | | | | 300 | | | | | |
| MMA | | 300 | [same | [same | [same | | [same | [same | [same | [same | [same |
| 2 EHA | | 180 | as in | as in | as in | | as in | as in | as in | as in | as in |
| EA | 210 | | Exam- | Exam- | Exam- | 252 | Com- | Exam- | Exam- | Exam- | Exam- |
| MAA | 150 | | ple 4] | ple 1] | ple 1] | 48 | para- | ple 3] | ple 3] | ple 1] | ple 1] |
| AA | | 120 | | | | | tive | | | | |
| ethyleneglycol monobutyl ether | 388 | 388 | | | | 388 | Example 2] | | | | |
| BPO | 12 | 12 | | | | 12 | | | | | |
| Solid content (%) | 59.8 | 60.0 | | | | 59.8 | | | | | |
| Viscosity (cps) | 6520 | 5350 | | | | 2800 | | | | | |
| Acid value | 158 | 150 | | | | 49 | | | | | |

The mixture (1) was charged in a 4-neck flask, the inside atmosphere of which had been replaced by nitrogen, and the inside temperature was elevated to 160° C. and cooking was carried out for 4 to 5 hours. The ratio of decrease of the oxirane content was 14%. Then, the reaction mixture was cooled to 80° C. and the component (2) was added thereto to obtain a modified epoxy resin solution having a solid content of 60%.

(C) Preparation of Aqueous Coating Resin Composition:

| (1) Carboxyl group-containing acrylic resin solution (A) prepared in Example 1 | 100.0 parts |
|---|---|
| Modified epoxy resin solution (B) | 50.0 parts |
| (2) 2-Dimethylaminoethanol | 9.3 parts |

In Table 1, abbreviations have the following meaning:
St: Styrene
MMA: methyl methacrylate
2EHA: 2-ethylhexyl acrylate
EA: ethyl acrylate
MAA: methacrylic acid
AA: acrylic acid
BPO: benzoyl peroxide.

(B) Preparation of Epoxy Resin Solution and Modified Epoxy Resin Solution:

An epoxy resin or modified epoxy resin solution was prepared according to a recipe shown in Table 2. All the starting materials other than ethyleneglycol monobutyl ether for dilution were charged in a 4-neck flask, and the temperature was elevated to a predetermined level and cooking was carried out for a predetermined time. Then, the reaction mixture was cooled to about 80° C. and ethyleneglycol monobutyl ether for dilution was added thereto.

TABLE 2

| Components (parts) | Example No. | | | | Comparative Example No. | | | | | | |
|---|---|---|---|---|---|---|---|---|---|---|---|
| | 3 | 4 | 5 | 6 | 1 | 2 | 3 | 4 | 5 | 6 | 7 |
| Epikote 1001 | | | | | 500.0 | | | | | | |
| Epikote 1007 | [same | 500.0 | 500.0 | 500.0 | | [same | [same | 500.0 | 500.0 | [same | [same |
| Epikote 1009 | as in | 55.6 | | | | as in | as in | | | as in | as in |
| bisphenol A | Exam- | | 1.7 | | | Exam- | Exam- | 6.8 | | Exam- | Exam- |
| coconut oil fatty acid | ple 1] | | | | | ple 1] | ple 5] | | 6.0 | ple 1] | ple 1] |

TABLE 2-continued

| Components (parts) | Example No. 3 | Example No. 4 | Example No. 5 | Example No. 6 | Comparative Example No. 1 | Comparative Example No. 2 | Comparative Example No. 3 | Comparative Example No. 4 | Comparative Example No. 5 | Comparative Example No. 6 | Comparative Example No. 7 |
|---|---|---|---|---|---|---|---|---|---|---|---|
| sodium carbonate | | | | | | | | | 0.2 | | |
| ethyleneglycol monobutyl ether (for reaction) | 138.9 | 125.4 | 125.0 | 125.0 | | | | 126.7 | 126.3 | | |
| ethyleneglycol monobutyl ether (for dilution) | 231.5 | 209.7 | 208.3 | 208.3 | | | | 211.2 | 210.8 | | |
| ratio of decrease of oxirane content (%) | — | 16 | 7 | — | | | | 62 | 59 | | |
| solid content (%) | 59.9 | 59.7 | 60.3 | 59.9 | | | | 59.9 | 60.1 | | |
| cooking temperature (°C.) | 160 | 160 | 160 | 160 | | | | 160 | 160 | | |
| cooking time (hours) | 1 | 5 | 5 | 1 | | | | 5 | 5 | | |

(C) Preparation of Aqueous Coating Resin Composition:

In all the Examples and Comparative Examples, except Comparative Examples 6 and 7, aqueous coating resin compositions were prepared according to recipes shown in Table 3 in the same manner as described in Example 1. In Comparative Example 6, the operation was conducted in the same manner as described in Exzero, and the viscosity was 2.5 times the viscosity before this cooking treatment.

After the above-mentioned cooking treatment, the component (3) was gradually added under agitation to obtain a slightly milky white dispersion having a solid content of 15.5% and a viscosity of 340 cps. When the resulting dispersion was stored at 50° C. for 1 month, no change was observed.

TABLE 3

| Components (parts) | Example No. 3 | Example No. 4 | Example No. 5 | Example No. 6 | Comparative Example No. 1 | Comparative Example No. 2 | Comparative Example No. 3 | Comparative Example No. 4 | Comparative Example No. 5 | Comparative Example No. 6 | Comparative Example No. 7 |
|---|---|---|---|---|---|---|---|---|---|---|---|
| acrylic resin solution | 100.0 | 100.0 | 100.0 | [same as in Example 1] | [same as in Example 1] | 100.0 | [same as Comparative Example 2] | 100.0 | [same as Comparative Example 4] | [same as in Example 1] | 100.0 |
| epoxy resin solution | 100.0 | 50.0 | 100.0 | | | 50.0 | | 50.0 | | | 50.0 |
| 1-dimethylaminoethanol | 15.5 | 14.8 | 14.8 | | | 5.0 | | 15.5 | | | 9.3 |
| deionized water | 384.5 | 285.2 | 385.2 | | | 295.0 | | 285.4 | | | 419.0 |
| solid content (%) | 20.4 | 20.0 | 20.1 | 19.9 | 20.1 | 19.7 | 19.9 | 20.2 | 20.1 | 20.1 | 15.5 |
| viscosity (cps) | 315 | 865 | 392 | 377 | 180 | 246 | 325 | 475 | 443 | 108 | 340 |
| acid value | 74 | 97 | 66 | 57 | 29 | 33 | 28 | 104 | 104 | 93 | 53 |
| residual ratio of oxirane content (R, %) | 41 | 32 | 24 | 32 | 8 | 70 | 62 | 12 | 15 | 100 | 0 | ample 1 except that the carboxyl group-containing acrylic resin solution and epoxy resin solution were not cooked but were merely mixed at 25° C.

COMPARATIVE EXAMPLE 7

An aqueous coating resin composition (C) was prepared in the same manner as described in Example 1 except for the following changes.

| (1) Carboxyl group-containing acrylic resin solution (A) same as used in Example 1 | 100 parts |
|---|---|
| Epoxy resin solution (B) same as used in Example 1 | 50 parts |
| (2) 2-Dimethylaminoethanol | 9.3 parts |
| (3) Deionized water | 419 parts |

All of the mixture (1) was charged in a 4-neck flask, and the component (2) was added thereto under stirring to neutralize the contained carboxyl groups substantially equimolarly. Then, the inside temperature was elevated to 125° C. and stirring was conducted at this temperature for 90 minutes. Then, the mixture was cooled to room temperature. The oxirane content was Each of the aqueous coating resin compositions prepared in Examples 1 through 6 and Comparative Examples 1 through 7 was subjected to the stability test. Furthermore, after each composition had been allowed to stand still at room temperature for 5 hours, the composition was roll-coated on a tinplate having an undercoating of an epoxy-urea resin, so that the thickness of the dry coating was 10 to 12μ. and baking was carried out at 160° or 200° C. for 5 minutes to form a test panel. The so obtained test panel was subjected to various resistance tests. Results of the stability and resistance tests are shown in Table 4.

Each of the above-mentioned coating compositions was spray-coated on the inner surface of a 3-piece tinplate can having an inner diameter of 52.5 mm, a top and bottom lap seam height of 132.8 mm and an inner capacity of 268 cc, and baking was carried out at 160° or 200° C. for 5 minutes. Physical properties of the resulting inner surface-coated metal can were tested to obtain results shown in Table 5.

With respect to the results of the resistance tests, there was found no substantial difference between the case where the untreated tinplate was used and the case where the undercoated tinplate was used. Therefore, only results of the resistance tests made on the untreated tinplate are shown.

TABLE 4

| Test Item Baking Temperature (°C.) | Adhesion 160° C. | Adhesion 200° C. | Resistance to Boiling Water 160° C. | Resistance to Boiling Water 200° C. | Processability 160° C. | Processability 200° C. | Storage Stability | State of Coating |
|---|---|---|---|---|---|---|---|---|
| Example 1 | 100/100 | 100/100 | o | o | o | Δ | o | o |
| Example 2 | 100/100 | 100/100 | o | o | o | o | o | o |
| Example 3 | 100/100 | 100/100 | Δ | o | o | Δ | o | o |

TABLE 4-continued

| Test Item<br>Baking Temperature (°C.) | Adhesion 160° C. | Adhesion 200° C. | Resistance to Boiling Water 160° C. | Resistance to Boiling Water 200° C. | Processability 160° C. | Processability 200° C. | Storage Stability | State of Coating |
|---|---|---|---|---|---|---|---|---|
| Example 4 | 100/100 | 100/100 | ⊙ | ⊙ | ⊙ | ⊙ | ⊙ | ⊙ |
| Example 5 | 100/100 | 100/100 | ⊙ | ⊙ | ⊙ | ⊙ | ⊙ | ⊙ |
| Example 6 | 100/100 | 100/100 | ⊙ | ⊙ | ⊙ | ⊙ | ⊙ | ⊙ |
| Example 7 | 100/100 | 100/100 | ⊙ | ⊙ | ⊙ | ⊙ | ⊙ | ⊙ |
| Comparative Example 1 | 100/100 | 100/100 | X | Δ | Δ | X | X (gelled after 1 day) | ⊙ |
| Comparative Example 2 | 100/100 | 100/100 | ⊙ | ⊙ | ⊙ | Δ | X (precipitated after 2 days) | ⊙ |
| Comparative Example 3 | — | — | — | — | — | — | X (no dispersion obtained) | ⊙ |
| Comparative Example 4 | 100/100 | 100/100 | X | ⊙ | ⊙ | ⊙ | X (phase separation after 2 days) | ⊙ |
| Comparative Example 5 | 100/100 | 100/100 | X | ⊙ | ⊙ | ⊙ | X (phase separation after 2 days) | ⊙ |
| Comparative Example 6 | 100/100 | 100/100 | ⊙ | ⊙ | ⊙ | X | X (precipitated after 2 days) | X (opalized) |
| Comparative Example 7 | 100/100 | 100/100 | Δ | ⊙ | ⊙ | Δ | ⊙ | ⊙ |

TABLE 5

| Test Item<br>Treatment Conditions<br>Baking Temperature | Potassium permanganate consumption (ppm) 60° C. × 30 min 160° C. | 200° C. | 100° C. × 30 min 160° C. | 200° C. | Water extraction ratio (ppm) 60° C. × 30 min 160° C. | 200° C. | 100° C. × 30 min 160° C. | 200° C. | Flavoring-retaining property 100° C. × 30 min & 50° C. × 6 months 160° C. | 200° C. |
|---|---|---|---|---|---|---|---|---|---|---|
| Example 1 | 1.2 | 0.5 | 7.1 | 3.0 | 0.2 | 0.1 | 1.2 | 0.5 | ⊙~Δ | ⊙ |
| Example 2 | 1.0 | 0.4 | 5.3 | 2.5 | 0.2 | 0.1 | 0.9 | 0.4 | ⊙ | ⊙ |
| Example 3 | 1.3 | 0.5 | 7.0 | 2.9 | 0.2 | 0.1 | 1.2 | 0.5 | ⊙~Δ | ⊙ |
| Example 4 | 1.0 | 0.4 | 4.6 | 2.3 | 0.2 | 0.1 | 0.8 | 0.4 | ⊙ | ⊙ |
| Example 5 | 1.0 | 0.4 | 6.1 | 2.8 | 0.2 | 0.1 | 0.9 | 0.4 | ⊙ | ⊙ |
| Example 6 | 1.0 | 0.4 | 7.4 | 3.1 | 0.2 | 0.1 | 0.9 | 0.4 | ⊙ | ⊙ |
| Example 7 | 1.3 | 0.5 | 7.3 | 3.0 | 0.2 | 0.1 | 0.9 | 0.4 | ⊙ | ⊙ |
| Comparative Example 1 | 3.0 | 1.4 | 32.7 | 12.6 | 1.8 | 0.6 | 11.3 | 3.5 | X | Δ |
| Comparative Example 2 | 1.6 | 0.7 | 12.3 | 4.2 | 0.4 | 0.2 | 2.4 | 0.7 | ⊙ | ⊙ |
| Comparative Example 3 | — | — | — | — | — | — | — | — | — | — |
| Comparative Example 4 | 1.0 | 0.4 | 106 | 3.1 | 0.3 | 0.2 | 1.5 | 0.6 | Δ | ⊙~Δ |
| Comparative Example 5 | 1.4 | 0.6 | 11.5 | 3.9 | 0.4 | 0.2 | 2.3 | 0.7 | X | Δ |
| Comparative Example 6 | 2.3 | 0.8 | 29.3 | 5.2 | 1.7 | 0.3 | 10.5 | 1.2 | X | Δ |
| Comparative Example 7 | 14.5 | 2.1 | 28.3 | 4.4 | 3.4 | 0.4 | 8.9 | 1.1 | Δ | ⊙~Δ |

The tests mentioned in Tables 4 and 5 were carried out in the following manners.

(1) Adhesion:

Cut lines having a width of about 1.5 mm were formed on the coating by a knife. Namely, cut squares were formed by forming 11 of such cut lines in the lengthwise direction and 11 of such cut lines in the widthwise direction. Then, an adhesive cellophane tape was applied to the coating and bonded thereto, and the tape was strongly peeled. The number of the unpeeled squares is indicated in the numerator.

(2) Resistance to Boiling Water:

The coating was treated in boiling water at 100° C. for 30 minutes, and the resistance was evaluated by the visual observation and the above-mentioned adhesion test using an adhesive cellophane tape.

(3) Processability:

A sample having the lower portion folded in two was set at a special folding type Du Pont impact tester, and an iron weight of 1 Kg having a flat contact surface was let to fall down on the sample from a height of 50 cm and the length of the crack formed on the folded portion of the coating was measured.

○: 0 to 10 mm
Δ: 10 to 20 mm
X: longer than 20 mm (4) Storage Stability of Paint:

A sample was stored in an incubator maintained at 50° C., and the appearance and resistance to boiling water were examined at predetermined intervals during a period of 1 month.

○: good storage stability
X: abnormal changes in the dispersion, such as gelation, precipitation and phase separation (5) Potassium Permanganate Consumption:

250 ml of deionized water was filled in an inner face-coated metal can, and after lap seaming, the can was treated at 60° C. for 30 minutes or at 100° C. for 30 minutes. The potassium permanganate consumption was determined according to the method described in the Food Sanitation Act.

(6) Flavor-Retaining Property:

250 ml of deionized water was filled in an inner face-coated can, and after lap seaming, sterilization was carried out at 100° C. for 30 minutes and the can was stored at 50° C. for 6 months. The content was subjected to the flavor test.

○: no change
Δ: slight change
X: considerable change (7) Water Extraction Ratio:

250 ml of deionized water was filled in an inner face-coated can, and after lap seaming, the can was treated at 60° C. for 30 minutes or at 100° C. for 30 minutes. The content was evaporated by a rotary evaporator and the can was dried in vacuo. The weight of the residue was measured and expressed in terms of the ratio (ppm) to the volume of the content.

What we claim is:

1. An aqueous coating resin composition which comprises an aqueous dispersion of a self-emulsifiable and self-crosslinking resin composition having a pH of from 5 to 11 and being free of dispersing agents and surfactants, said resin being the neutralized product of a partial reaction product of (A) an alkali neutralizable acrylic resin having a number average molecular weight of 20,000 to 40,000, an acid value of from 80 to 240 and consisting essentially of 12 to 30% by weight of acrylic acid or methacrylic acid and 70 to 88% by weight of at least one of styrene, methylstyrene, vinyltoluene and alkyl esters of acrylic acid and methacrylic acid having 1 to 8 carbon atoms in the alkyl group, and (B) an epichlorohydrin/bisphenol epoxy resin which is selected from the group consisting of (a) epoxy resins having a number average molecular weight of 1,400 to 5,000 and two epoxy groups per molecule and (b) epoxy resins having a number average molecular weight of 2,000 to 10,000 and 1.1 to 2.0 epoxy groups per molecule, which is formed by heating an epoxy resin having a number average molecular weight of 1,400 to 5,000 and two epoxy groups per molecule in the presence of an epoxy-group modifying agent, at an (A)/(B) weight ratio of from 4/1 to ½, said partial reaction product of (A) and (B) having excess carboxyl groups in an amount sufficient to maintain the acid value of the self-emulsifiable and self-crosslinking resin composition between 30 and 200, and excess oxirane groups in an amount such that the residual ratio of the oxirane content (R) defined by the following formula:

$$R = \frac{100\, Y (M_A + M_B)}{M_B X}$$

wherein $M_A$ represent % by weight of the acrylic resin (A) contained in the partial reaction product, $M_B$ represents % by weight of the epoxy resin (B) contained in the partial reaction product, X represents a concentration (m-mol/100 g of solid) of oxirane group contained in the epoxy resin (B) and Y represents concentration (m-mol/100 g of solid) of oxirane group contained in the partial reaction product, is within from 5 to 95%, said partial reaction product of (A) and (B) being obtained by reacting the acrylic resin (A) with the epoxy resin (B) in the presence of a catalytic amount of an amine in the absence of an emulsifier.

2. The composition of claim 1 wherein the amine is selected from the group consisting of alkylamines, alcohol amines and morpholine.

3. The composition of claim 1 wherein said acrylic resin is selected from the group consisting of polymers of (1) methyl methacrylate, 2-ethylhexylacrylate and acrylic acid, (2) styrene, methylmethacrylate, ethyl acrylate and acrylic acid, and (3) styrene, ethyl acrylate and methacrylic acid.

4. The method of claim 1 wherein said epoxy resin (B) is said epoxy resin (b) wherein the epoxy group modifying agent is a bisphenol or a monovalent fatty acid.

* * * * *